Figure 1:
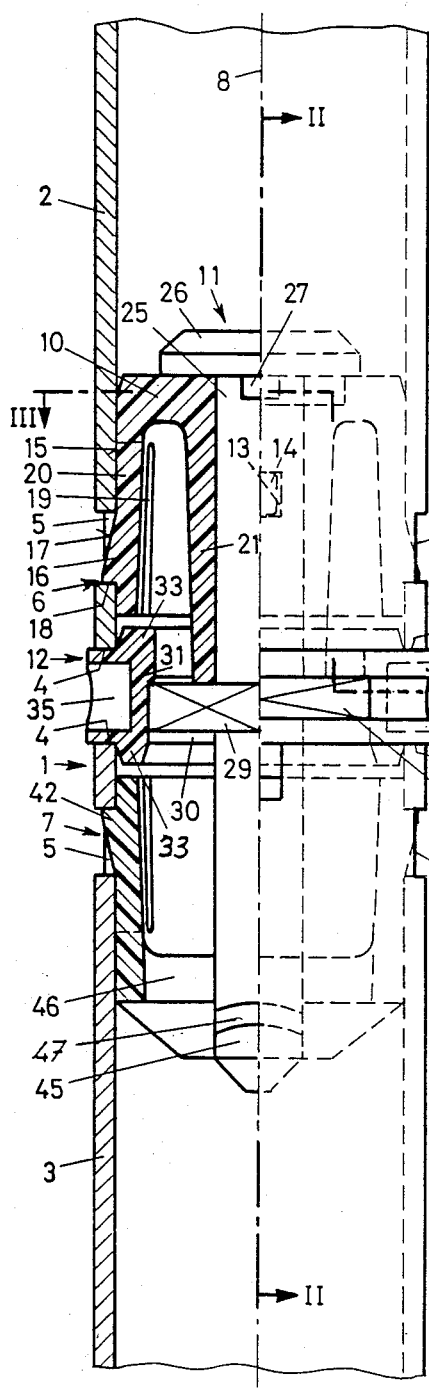

United States Patent [19]

Rütsche et al.

[11] Patent Number: 4,903,924
[45] Date of Patent: Feb. 27, 1990

[54] COUPLING FOR THE DETACHABLE CONNECTING OF TWO COAXIAL PIPES AND CARRYING COLUMN FOR A ROOM DIVIDER CONTAINING THE COUPLING

[75] Inventors: Wendolin Rütsche, Rüti; Rudolf Menzi, Wagen, both of Switzerland

[73] Assignee: Embru-Werke, Mantel & Cie., Ruti, Switzerland

[21] Appl. No.: 302,798

[22] Filed: Jan. 27, 1989

[30] Foreign Application Priority Data

Jan. 28, 1988 [CH] Switzerland ............................ 291/88

[51] Int. Cl.⁴ .............................. F16B 7/20; E04B 2/78
[52] U.S. Cl. ..................................... 248/159; 403/292; 403/348
[58] Field of Search ................ 248/159; 403/292, 348, 403/349

[56] References Cited

U.S. PATENT DOCUMENTS

| | | | |
|---|---|---|---|
| 1,960,405 | 5/1934 | Amor | 403/292 |
| 2,868,602 | 1/1959 | Drezner | 108/144 X |
| 3,918,821 | 11/1975 | Schlegel et al. | 403/292 |

Primary Examiner—Alvin C. Chin-Shue
Attorney, Agent, or Firm—Kinzer, Plyer, Dorn, McEachran & Jambor

[57] ABSTRACT

A first coupling part (6) consists of a bushing (10), a coupling bolt (11) and a ring (12) and is inserted into the end of a pipe (2). Two rest lugs (16) of the bushing (10) engage there into rectangular break-throughs (5) of the pipe (2). The coupling bolt (11) is turnable in the bushing (10) and lies with a head (26) against it. It is joined secure against with the ring (12). This has support shoulders (32) for the support of the face surfaces (4) of the pipes (2, 3). On its circumference it has two wrench surfaces (34). A second coupling part (7) is cup-shaped and is likewise snapped in place with rest lugs (42) in break-throughs (5) of the other pipe (3). The base (43) has an oblong hole (46) through which a bolt (45) of the coupling bolt (11) can be inserted. After turning of the bolt (11) through 90° a spherical supporting surface (47) of the bolt (45) lies against the cylindrical support surface (44) of the second coupling part (7) and clamps the coupling. Through this construction the coupling can be rapidly mounted and it does not project beyond the circumference of the pipes. The coupling is suited especially for connecting elements arranged one over another of a support column of a space divider.

9 Claims, 2 Drawing Sheets

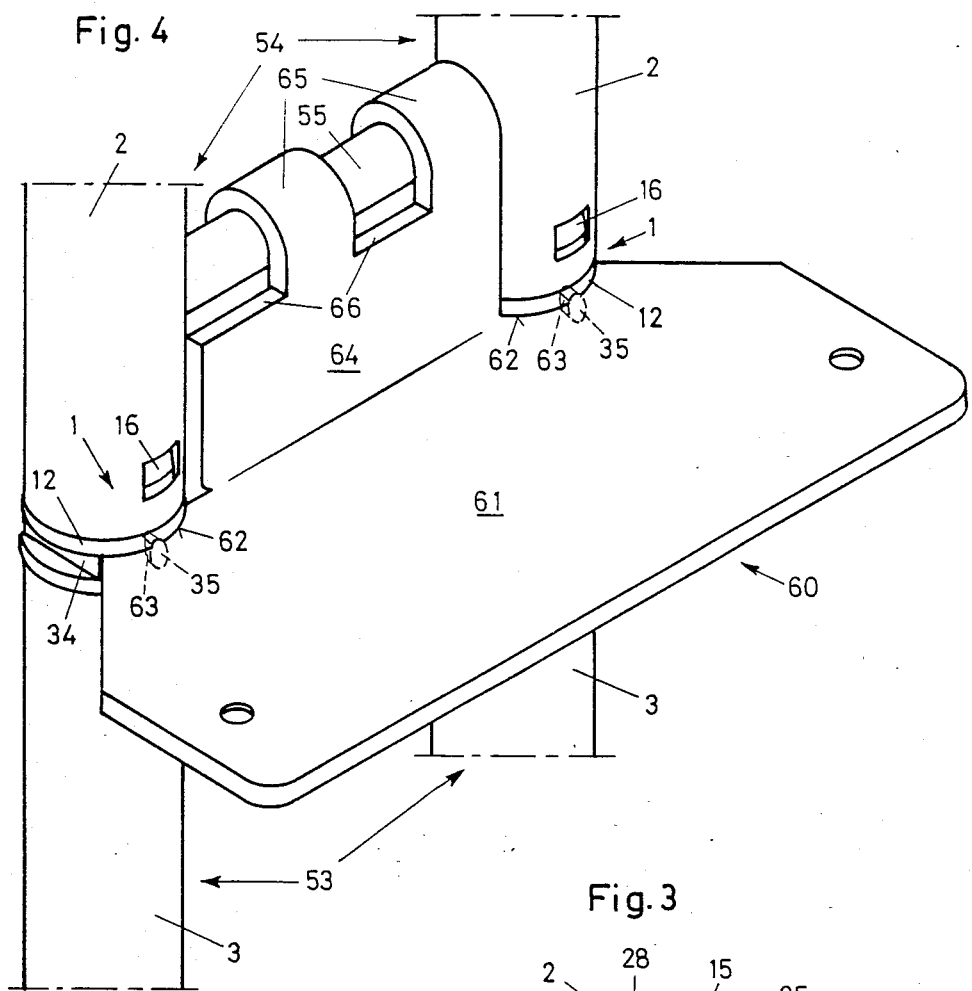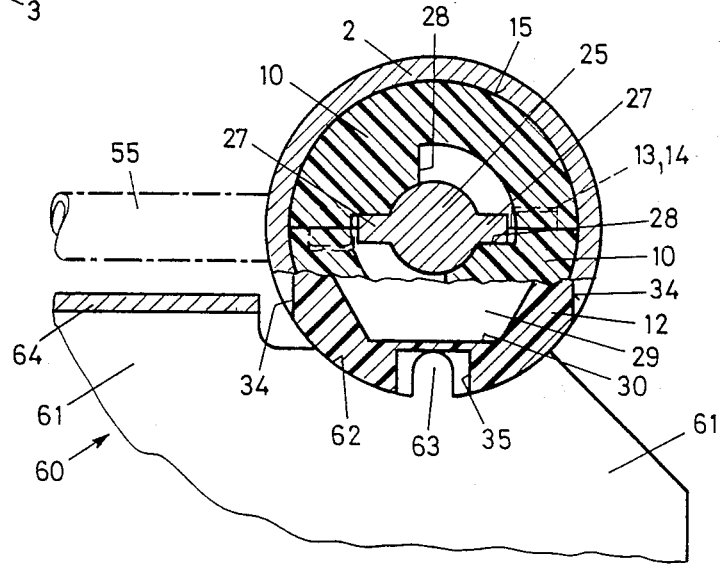

COUPLING FOR THE DETACHABLE CONNECTING OF TWO COAXIAL PIPES AND CARRYING COLUMN FOR A ROOM DIVIDER CONTAINING THE COUPLING

Couplings for the detachable connection of two coaxial pipes are mostly complicated to assemble and/or project over the pipe cross section, which in some cases of application is undesired. Underlying the present invention is the problem of creating a rapidly mountable coupling that does not project beyond the pipe cross section. This problem is solved by the characterizing features of claim 1.

Figure 2:
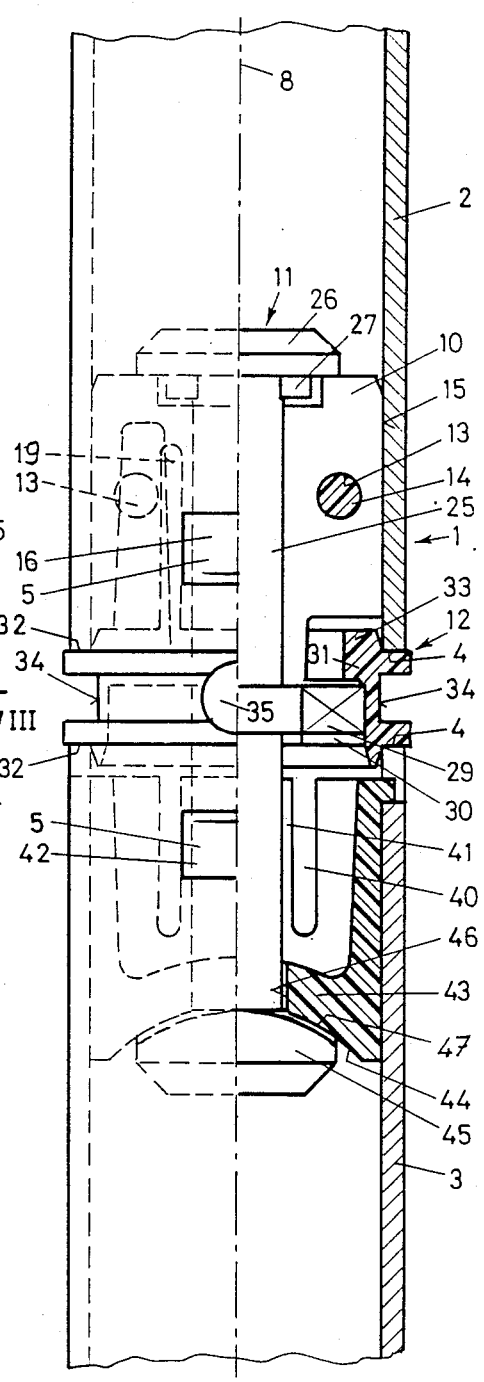

In the following an example of execution of the invention is explained with the aid of the drawing. In this:

FIG. 1 shows an axial section through a pipe coupling;

FIG. 2 a section along the line II—II in FIG. 1;

FIG. 3 a section along the line III—III in FIG. 1, and

FIG. 4 a perspective view of the connecting place of two column parts which are joined with one another with couplings according to FIGS. 1 to 3.

The coupling 1 represented in FIGS. 1 to 3 connects with one another face to face two coaxial pipes 2, 3 of the same circular cross section. Both pipes 2, 3 have adjacent to their face surfaces 4 two diametrically oppositely lying rectangular breakthroughs 5. In the breakthroughs 5 of the pipe 2 there is snapped a first coupling part 6, in the break-throughs 5 of pipe 3 a second coupling part 7.

The coupling part 6 consists of a bushing 10, a coupling bolt 11 and a ring 12. The bushing 10 is divided into two identical halves along the drawing plane of FIG. 2 containing the axis 8 of the pipes 2, 3 and coupling 1. The two halves are centered by two pins 14 protruding perpendicularly to the separation plane, engaging into conical holes 13. Each bushing half has a lug 16 projecting beyond the cylindrical outside circumference 15 of the bushing 10, with a wedge surface 17 turned away from the ring 12 and a radial face surface 18 facing the ring 12. The lug 16 is formed on a radially resilient tongue 20 formed by longitudinal slits 17 of approximately the width of the appertaining breakthrough 5 and is snapped in this breakthrough 5. A hub part 21 of the bushing 10 encloses a cylindrical shaft 25 of the coupling bolt 11. The coupling bolt 11 is borne turnably and axially unshiftable in this hub part 21. For the limitation of the angle of rotation of the coupling bolt 11 to 90° there are formed adjacent to a head 26 of the coupling bolt 11 on its side facing the bushing 10 two stop lugs 27 on the shaft 25. These cooperate with corresponding stop surfaces 28 of the bushing 10 (FIG. 3).

At the opposite end a hexagonal flange 29 of the coupling bolt 11 abuts the hub part 21. The edge diameter of this flange 29 is greater than the diameter of the head 26. The flange 29 is seated in a fitted hexagonal recess 30 of the ring 12. Between the hexagonal flange 29 and the head 26 the ring 12 has a constriction 31 with an inside diameter that is less than the edge diameter of the hexagonal flange 29, but greater than the diameter of the head 26. With installed first coupling part 6, therefore, its ring 12 is held in its position by the flange 29. The ring 12 has two radial support shoulders 32 which rest on the face surfaces 4 of the pipes 2, 3. The ring 12 has on both sides a conical centering protrusion 3, which is inserted in the pipe ends. Between the support shoulders 32 the ring 12 has two wrench surfaces 34. By means of a wrench engaging into these surfaces the ring 12 and therewith the coupling bolt 11 can be turned. Offset by 90° to these wrench surfaces 34 the ring 12 has two radial blind holes 35. At least in the zone of these blind holes 35 the diameter of the ring 12 corresponds to the diameter of the pipes 2, 3.

The one-piece second coupling part 7 is cup-shaped and is fastened in the pipe 3 in an analogous manner as the two-part bushing 10 in the pipe 2. The coupling part 7, therefore, likewise has two radially springy tongues 41 with lugs 42 formed by longitudinal slits 40, which lugs 42 are snapped into the breakthroughs 5 of the pipe 3. The face surface of the base 43 of the coupling part 7 extending into the interior of the pipe 3 forms a convex cylindrical engagement surface 44 for a crosspiece 45 of the coupling bolt 11. The base 43 is pierced by an axial oblong hole 46, through which the crosspiece 45 fits. The supporting surface facing the engagement surface 44 of the crosspiece 45 is spherical and has the same radius of curvature as the engagement surface 44. This formation of the crosspiece 45 and base 43 yields in the turning of the coupling bolt 11 a tightening, so that the two pipes 2, 3 are clamped fast against the support shoulders 32 of the ring 12. The bushing 10, the ring 12 and the second coupling part 7 consist expediently of a form-stable, high strength plastic material, for example of polyamide, preferably with fiber reinforcement.

The coupling described can be joined and again released by a turning of 90°, and it has the advantage that it does not project beyond the diameter of the pipes 2, 3. The coupling described is especially well suited for connecting column elements 53, 54 arranged perpendicularly one over another for a room divider when the column elements 53, 54 consist of two vertical pipes 2, 3 with circular cross section joined with one another by horizontal connecting rods 55 (FIG. 4). The pipes 2, 3 placed one over another of these column elements are joined with one another by couplings 1. The columns 53, 54 carry separating elements, for example partitions, cabinet or drawer elements.

These separating elements rest on L-shape bent rack board carriers 60 of sheet metal. The lower, horizontal shank 61 of the carrier 60 has two circular segmental recesses 62 for engagement on the two rings 12. From each of these recesses 62 there stands out a projection 63 which in the assembled state engages into the blind bores 35 of the rings 12. On the vertical shank 64 there are formed fingers 65 bent around through 180°. These fingers 65 in the assembled state grip around the connecting rods 55 and transfer the load to these rods. The fingers 65 are asymmetrically constructed and leave open on one side and between them a gap 66 that is wider than the finger width. Thereby on the same connecting rod 55 there can be suspended two identical carriers 60 in mirror image to the middle plane of the columns 53, 54. The fingers 65 of the one carrier fit into the gaps 66 of the other carrier.

When the carrier 60 is installed and a rack board is placed on the carrier 60, this carrier is fixed in position and cannot be moved to either side. The carrier 60 secures simultaneously also the rings 12. Furthermore, through this construction it is assured that the couplings 1 are fully coupled, for if the rings 12 are not turned or are turned only partly, the carrier 60 hangs crookedly and the respective separating element cannot be installed. The same carriers 60 are used also at other heights of the column 53, 54. For this the pipes 2, 3, under each of the other connecting rods 55, have transverse bores corresponding to the blind holes 35. Because of this additional use of the carriers 60, the rings 12 in the zone of the blind bores 35 have the same diameter as the pipes 2, 3.

We claim:

1. Coupling for the detachable connecting of two coaxial pipes (2, 3) of the same cross section, which both have adjacent to their face surfaces (4) two diametrically oppositely lying breakthroughs (5), characterized in that the coupling (1) consists of a first coupling part (6) intended to be inserted into the end of the one pipe (2) and a second coupling part (7) intended to be inserted into the end of the other pipe (3), that the first coupling part (6) comprises a bushing (10) with at least two radially resilient rest lugs (16) for snapping into the breakthroughs (5), a coupling bolt (11) turnable about the coupling axis (8), extending along this axis (8), as well as a coaxial ring (12) jointed secure against turning with the coupling bolt (11) with a radial support shoulder (32) on both sides for abutting against the two face surfaces (4) of the pipes, a centering protrusion (33) on both sides insertable in the respective pipe end and with wrench engagement elements (34) between the support shoulders (32), that the coupling bolt (11) abuts with a head (26) turnably on the bushing (10) and carries at the opposite end a crosspiece (45) the width of which is less than the width of an axial oblong hole (46) in the second coupling part (7), which presents further radially resilient rest lugs (42) for snapping into the breakthroughs (5) of the other pipe (3), in which system after sliding of the crosspiece (45) through the oblong hole (46) and after the turning of the coupling bolt (11) the crosspiece (45) grips behind the second coupling part (7).

2. Coupling according to claim 1, characterized in that the bushing (10) is divided along a plane containing the axis (8) into two identical parts which are centered with respect to one another on their separating surface by centering elements (13, 14).

3. Coupling according to claim 2, characterized in that the coupling bolt has a radial, unround flange (29) the greatest radial dimension of which is greater than the radius of the head (26), that the flange (29) is inserted into a fitting recess (30) in the ring (12), and that the ring (12) has between the flange (29) and the head (26) a constriction (31) with an axial passage bore, the radius of which is greater than the radius of the head, but is smaller than the greatest radial dimension of the flange (29).

4. Coupling according to claim 3, characterized in that a cylindrical shaft (25) of the coupling bolt (11) is turnably borne in the bushing (10).

5. Coupling according to claim 4, characterized in that a stop lug (27) protrudes from the coupling bolt (11), and that in the bushing (10) there are arranged stop surfaces (28) cooperating with the stop lug (27) to limit the angle of rotation of the coupling bolt (11) to 90°.

6. Coupling according to claim 1, characterized in that the second coupling part (7) presents a convex cylindrical engagement surface (44) for the crosspiece (45), the axis of curvature of this engagement surface (44) running perpendicular to the coupling axis (8), and that the supporting surface (47) of crosspiece (45) facing the engagement surface is approximately spherical.

7. Coupling according to claim 1, characterized in that the ring (12) presents two radial recesses (35) lying diametrically opposite.

8. Carrying column for a room divider, comprising a lower column element (53) and an upper column element (54) which are both formed by two vertical pipes (2, 3) spaced from one another, joined with one another by horizontal connecting rods (55), wherein the two pipes (3) of the lower column element (53) are joined with the two pipes (2) of the upper column element (54) by a coupling (1) each according to claim 7, and in which the first coupling part (6) is installed in the upper pipe (2) and the second coupling part (7) is installed in the lower pipe (3).

9. Room divider with carrying columns according to claim 8, with a rack board carrier (6) consisting of a horizontal shank (61) for support of a rack board and a vertical shank (64) which at the top is formed into fingers (65) bent around through 180°, which are suspended on the connecting rod (55) directly above the couplings (1), the horizontal shank (61) having two recesses (62) abutting against the two rings (12) of the couplings (1), which recesses each have a projection (63) engaging into one of the recesses (35) of the ring (12).

* * * * *